United States Patent [19]

Nordella et al.

[11] Patent Number: 5,022,708

[45] Date of Patent: Jun. 11, 1991

[54] MECHANICAL SEAT APPARATUS FOR SIMULATING MOTION

[75] Inventors: Tim M. Nordella, Frazier Park; William J. Sieber, Northridge, both of Calif.

[73] Assignee: Creative Presentations, Inc., Valencia, Calif.

[21] Appl. No.: 437,345

[22] Filed: Nov. 16, 1989

[51] Int. Cl.$^5$ .......................................... F16M 13/00
[52] U.S. Cl. .................................. 297/327; 297/330; 248/663; 248/398; 248/181; 248/288.5
[58] Field of Search ............... 248/639, 647, 652, 653, 248/660, 661, 662, 663, 371, 398, 415, 416, 157, 419, 424, 425, 429, 430, 181, 288.3, 288.5; 297/330, 344, 325, 326, 327; 403/132, 141

[56] References Cited

U.S. PATENT DOCUMENTS

| 8,380 | 8/1878 | White | 297/327 |
|---|---|---|---|
| 369,124 | 8/1887 | Powers | 248/157 |
| 605,527 | 6/1898 | Swartz | 248/181 |
| 619,596 | 2/1899 | Mayer | 248/398 |
| 659,532 | 10/1900 | Jordan | 248/181 |
| 1,032,614 | 7/1912 | Lamb | 248/419 |
| 1,228,434 | 6/1917 | Hedberg | 248/419 |
| 3,860,228 | 1/1975 | Cronier | 248/181 |
| 4,752,102 | 6/1988 | Rasmussen | 248/405 |

FOREIGN PATENT DOCUMENTS

| 131311 | 6/1978 | Fed. Rep. of Germany | 248/416 |
|---|---|---|---|
| 766916 | 9/1980 | U.S.S.R. | 248/415 |

Primary Examiner—Ramon O. Ramirez
Assistant Examiner—Robert A. Olson
Attorney, Agent, or Firm—Spensley Horn Jubas & Lubitz

[57] ABSTRACT

The present invention relates to a mechanical seat apparatus for simulating motion which includes a novel spherical bearing located below each seat for providing realistic simulation of motion in the yaw, pitch and roll directions. The spherical bearing includes means for preventing movement of the spherical bearing in the event of a power failure or other similar event to avoid injury to the viewers. The mechanical seat apparatus of the present invention also includes supporting structure which enables movement of each seat in the backward and forward, side to side and upward and downward directions, for a total of six degrees of freedom. Common hydraulics are provided to simultaneously impart motion to a plurality of seats.

17 Claims, 4 Drawing Sheets

MECHANICAL SEAT APPARATUS FOR SIMULATING MOTION

BACKGROUND OF THE INVENTION

1. Field of the Invention

The present invention relates to a mechanical seat apparatus, and more particularly, to a mechanical seat apparatus designed to simulate motion for a person viewing a video or other program.

2. Description of the Prior Art

Recently, movement simulators have become popular in which a viewer seated in a specially designed seat is shown a video or other program. The seat is designed to tilt or otherwise move in conjunction with the program to simulate motion shown in the program. Common applications for such simulators have been as flight simulators, video game simulators, and dark show simulators where an audience seated in a number of adjacent simulators is shown a common video or program.

In the field of simulators, it has always been a goal to realistically simulate motion. Past simulator designs have therefore attempted to provide as many degrees of freedom of movement as possible. Unfortunately, the number of degrees of freedom imparted to each seat has always been limited due to inadequate designs as well as a number of disadvantages associated with the use of hydraulic actuation cylinders.

Past simulator designs have typically included a separate hydraulic cylinder for imparting and controlling movement in each desired direction, with a separate set of hydraulics provided for each seat. As a consequence, as the number of degrees of freedom has increased, so too has the number of hydraulic cylinders and the magnitude of the associated disadvantages. For example, with added hydraulics, levels of generated noise and heat rise significantly during actuation of the hydraulic cylinders, detracting from the enjoyment of the viewer. These disadvantages are magnified in the case of multiple simulators located in close proximity, such as in dark shows. In addition, as the number of hydraulic cylinders increases, additional costs of manufacture and maintenance are incurred. Moreover, additional space must be provided below and adjacent to each seat to house the hydraulic cylinders, constraining the number of seats that can be installed in a dark show auditorium.

As a result of these and other disadvantages, past seat designs have operated with only a small number of hydraulic cylinders and associated degrees of freedom, resulting in less than ideal simulated motion.

Past simulators have also been disadvantageous from a personal injury standpoint. When separate hydraulics are used, adjacent seats may independently tilt or otherwise move towards one another during a power failure, resulting in viewers being "pinched" between seats. Moreover, even with single seat designs, seats may lurch forward or to the side during power failure, leading to injury.

In order to minimize the number of hydraulics and the disadvantages associated therewith, a second known approach has provided common hydraulics for controlling the movement of more than one seat. One such known design includes a common platform located above ground level on which two adjacent seats in the same row are mounted. Motion such as tilting is imparted to the platform via common hydraulics located at a point on the platform approximately midway between the two seats. Although this design reduces the number of hydraulic cylinders required for movement of the seats as compared to the independent approach, the design is disadvantageous because viewers seated in the seats are not exposed to "true" motion, particularly because the center of movement of the platform is located at a point distant from each seat rather than immediately below each seat. In addition, while the likelihood of personal injury is reduced with respect to seats located on the same platform, seats located on adjacent but independently controlled platforms may still tilt towards one another and "pinch" viewers. Furthermore, lurching may still occur during power failure, leading to injury.

SUMMARY OF THE INVENTION

The present invention relates to a mechanical seat apparatus for simulating motion which realistically provides numerous different degrees of movement for the viewer. The present invention also avoids all of the aforementioned disadvantages common to multiple adjacent simulator applications such as dark shows.

The present invention accomplishes these objectives by providing a novel structure which includes a spherical bearing located below the seat of the viewer. The spherical bearing enables each seat to undergo movement in the directions of pitch, roll, and yaw, providing three separate degrees of freedom. Motion simulation is realistic because the center of motion is located directly below each seat, with each spherical bearing maintaining the entire load of the seat and viewer. The spherical bearing also contains structure to prevent movement of the seat in relation to the spherical bearing in the event of a power failure or similar event, thus preventing the seat from lurching, or adjacent seats from "pinching" viewers therebetween in multiple simulator applications.

Three additional degrees of freedom, namely upward and downward, side to side, and backward and forward motion, may be provided by a substructure which includes a foundation stage assembly capable of rolling from side to side, and intermediate stage assembly located above and which rolls forward and backward upon the foundation stage assembly, and a seat stage assembly which rolls upward and downward within the intermediate stage assembly. In multiple simulator applications, common hydraulics are used to impart most of the desired motions.

BRIEF DESCRIPTION OF THE DRAWINGS

In the description which follows, an illustrative embodiment of the present invention is explained in greater detail with the aid of the drawings in which.

DETAILED DESCRIPTION OF THE INVENTION

This invention is described with respect to the preferred physical embodiment constructed in accordance therewith. It will be apparent to those skilled in the art that various modifications and improvements may be made without departing from the scope and spirit of the invention. Accordingly, the invention is not limited by the specific embodiment illustrated and described, but only by the scope of the appended claims.

The mechanical seating apparatus of the present invention relates to a novel a design for realistic simulation of motion by a viewing audience. For illustrative purposes only, the invention is described with respect to the supporting structure and operation of a single seat simulator. However, the invention also encompasses multiple simulator applications and is especially adapted for use with hydraulics common to a plurality of seats.

Figure 1:
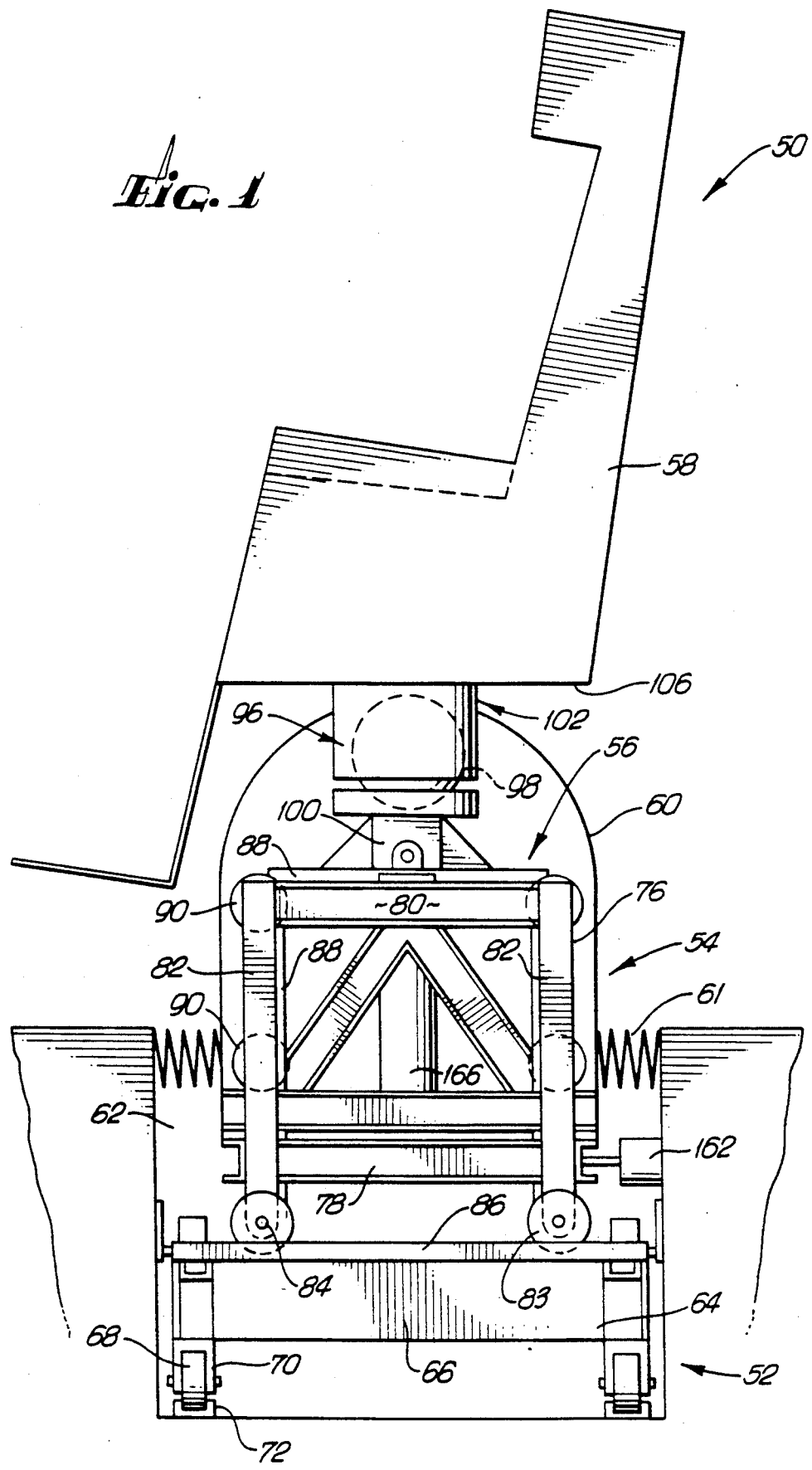
FIG. 1 shows a side view of the mechanical seat apparatus of the present invention.
Figure 2:
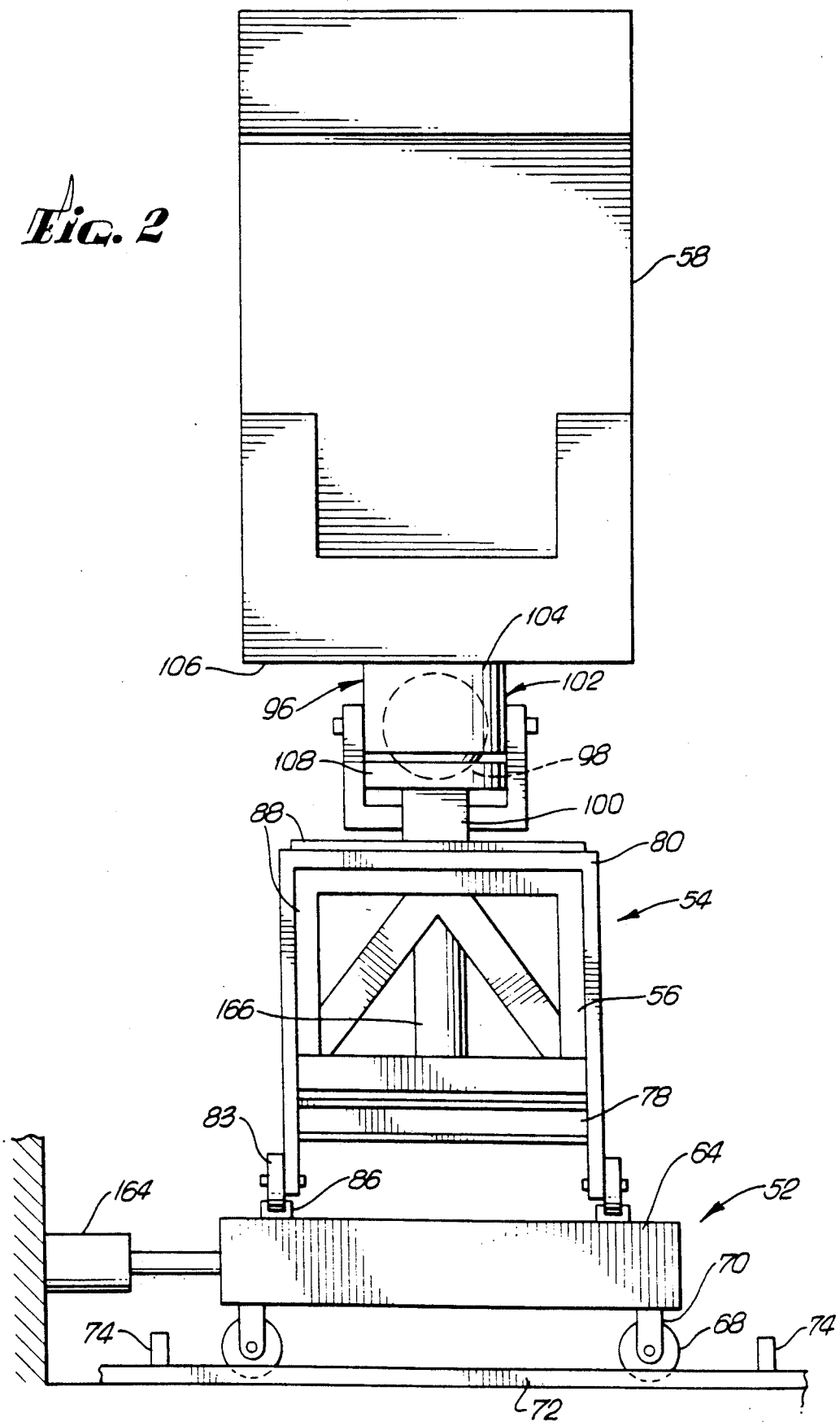
FIG. 2 shows a front view of the mechanical seat apparatus of the present invention.

As illustrated in FIGS. 1 and 2, the mechanical seat apparatus 50 of the present invention includes a foundation stage assembly 52, a intermediate stage assembly 54, a seat stage assembly 56 and a seat 58. A safety cover 60 of flexible plastic or other material extends over the foundation, intermediate and seat stage assemblies to prevent interaction of these assemblies with the viewer. The safety cover 60 preferably includes accordion type folds 61 to accommodate for movement of the mechanical seat apparatus 50.

The foundation stage assembly 52 and at least a portion of intermediate stage assembly 54 are located within a trench or hole 62 which extends along the direction of the row of seats. The foundation stage assembly 52 includes a horizontal and preferably rectangular frame 64 having front, back and side support members 66. Located at the lower corners of the front and back support members are guide wheels 68 which may be secured by pins and/or mounting brackets 70. The guide wheels 68 are mounted to enable rolling in the direction of the length of the trench or hole 62 along fixed channels 72 extending along the length of the floor of the trench or hole 62. As is best illustrated with reference to FIG. 2, stopping mechanisms such as blocks 74 may be positioned at points along the channels 68 to prevent movement of the guide wheels past predetermined locations in the case a power failure or similar event.

Located immediately above and resting upon the foundation stage assembly 52 is the intermediate stage assembly 54. The intermediate stage assembly 54 includes a frame 76 that is preferably shaped as a three dimensional rectangle, with at least one lower rectangular horizontal structural support 78, at least one upper rectangular horizontal structural support 80, and vertical frame members 82 located at each of the four corners extending between the lower horizontal structural support 78 and the upper horizontal structural support 80. Guide wheels 83 may be connected to the lower end of the vertical frame members 82 by pins and/or brackets 84 (not shown, but similar to brackets 70) to allow the intermediate stage assembly 54 to roll forward and backward along channels 86 located on the upper surface of the horizontal frame 64 of the foundation stage assembly 52.

Movably mounted within the intermediate stage assembly 54 is the seat stage assembly 56. The seat stage assembly 56 includes a frame 88 which is preferably identical in shape to but smaller than the frame 76 of the intermediate stage assembly 54 so that it can vertically move within the intermediate stage assembly 54. The seat stage assembly 56 preferably includes eight guide wheels 90, each of which may be mounted at a corner of the frame 88 by pins and/or brackets (not shown, but similar to brackets 70) to enable the seat stage assembly 56 to roll upward and downward within the intermediate stage assembly along channels located on the frame members 82.

In summary, the foundation, intermediate and seat stage assemblies provide three degrees of freedom of movement to the seat apparatus.

The seat 58 is mounted to the seat stage assembly 56 via a spherical bearing 96. The spherical bearing 96, which bears the entire load of the seat 58 and viewer, allows the seat 58 to move about the seat stage assembly 56 with three additional degrees of freedom in a realistic fashion. The three degrees of freedom are yaw, pitch and roll, as described further below.

Figure 3:
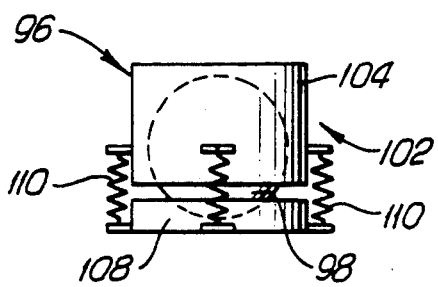
FIG. 3 shows a side view of one embodiment of the spherical bearing of the present invention.

As is more completely illustrated in FIGS. 2 and 3, the spherical bearing 96 includes at least an upper portion of a sphere 98, and preferably most of a sphere, which is mounted to the seat stage assembly via a support member 100, and a two part cylindrical housing 102 enclosed about portion of the sphere 98. The upper part 104 of the cylindrical housing 102 is mounted to the lower surface 106 of the seat 58 and extends over and is adapted to contact the at least a portion of the sphere 98. The lower part 108 of the cylindrical housing extends over a portion of the remainder of the sphere 98.

Figure 4:
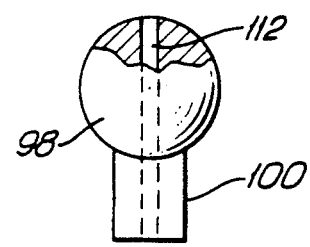
FIG. 4 shows a side cross sectional view of one embodiment of the spherical bearing of the present invention.

The upper 104 and lower parts 108 of the housing are biased towards one another in opposing relationship, preferably via springs 110 or other similar means, to enable movement of the upper part 104 in relation to the sphere 98 only when a predetermined force is applied to overcome the frictional forces between the upper part 104 and the sphere. For example, and as illustrated in FIG. 4, the sphere 98 may include a duct 112 extending to its uppermost surface through which high pressure air may be passed to create a force against the inside of the upper part of the housing 104. By selectively passing the high pressure air through the duct 112 when movement of the seat is desired, the spring bias between the upper and lower parts of the housing of the bearing may be overcome. Otherwise, the spring biasing force serves to keep the upper part 104 and the seat 58 stationary in relation to the sphere 98 and seat stage assembly, assuring that the seat 58 does not lurch in any direction during a power failure.

Alternate mechanisms for creating the biasing force include solenoids or other similar devices (not shown). Such solenoids, when not activated, should be biased to keep the upper housing part 104 in contact with the sphere 98. When activated, the upper housing part 104 should be moved out of contact with the sphere 98, allowing for relative movement of the upper housing part 104 with respect to the sphere 98. In the event of a power failure or similar event, the normal solenoid biasing should prevent movement of the upper housing part 104 and the lurching or "pinching" together of seats. Of course, this alternate mechanism would eliminate the need for high pressure air and the duct 112 through the sphere 98.

Figure 5:
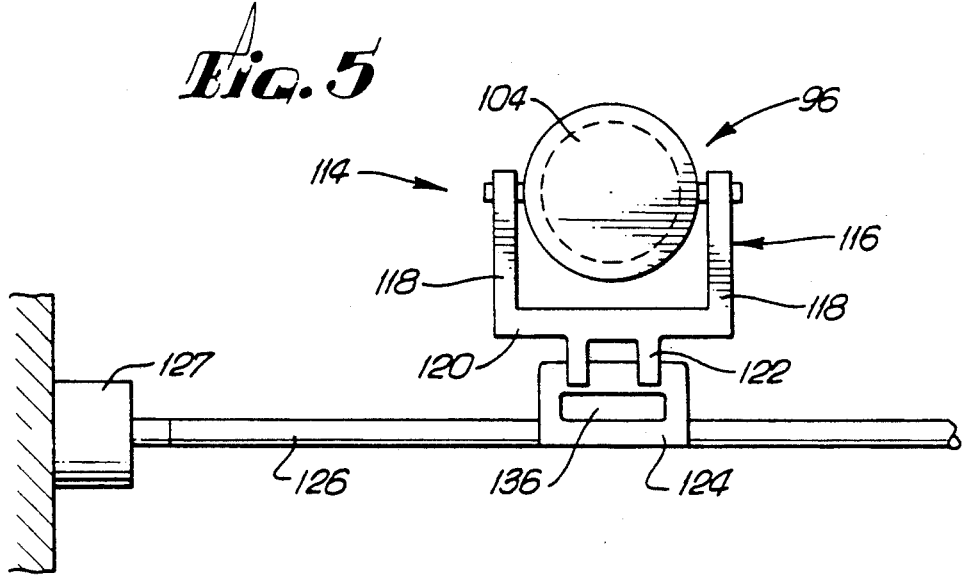
FIG. 5 shows a top view of the yaw drive assembly of the present invention.

Yaw, or rotation of the seat about a vertical axis passing through the center of the seat, is provided by the yaw drive assembly 114, best illustrated in FIG. 5.

The yaw drive assembly 114 includes a U shaped link 116 having two pivot arms 118 and an interconnecting portion 120. The pivot arms 118 are attached at their distant ends to the right and left sides of the upper housing part 104 of the spherical bearing 96. The interconnecting portion 120 of the U shaped link 116 includes a forked collar 122 which engages with a plate assembly 124 which is connected to a yaw drive tube 126. When the yaw drive tube 126 is axially actuated by a hydraulic cylinder 127, that motion is transferred via the plate assembly 124 and U shaped link 116 to the upper part of the housing 104 outer housing of the spherical bearing 96, resulting in yaw motion.

Figure 6:
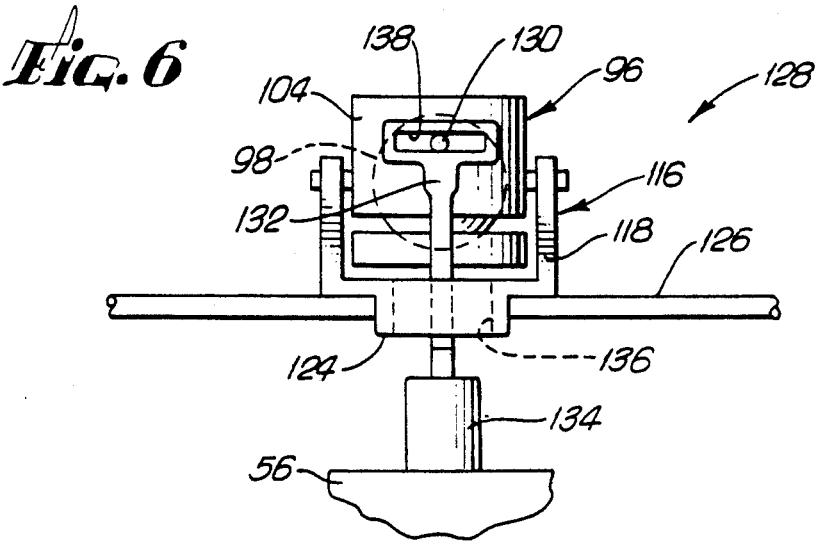
FIG. 6 shows a back view of the pitch drive assembly of the present invention.
Figure 7:
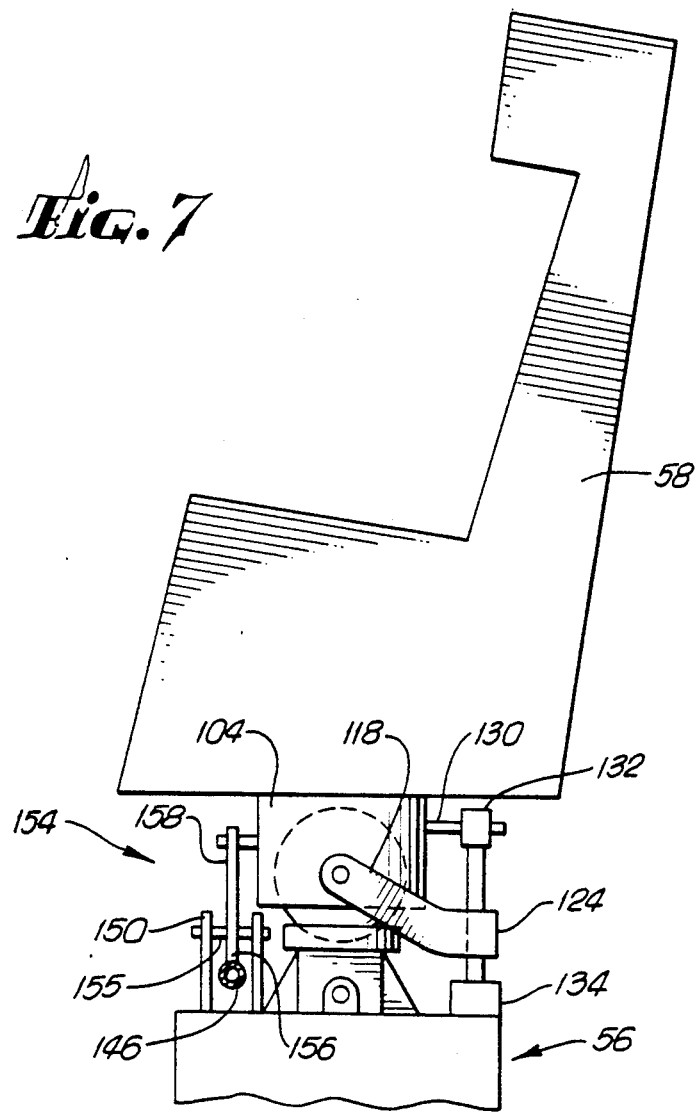
FIG. 7 shows a side view of the roll drive assembly of the present invention.

Pitch, or rotation of the seat 58 in a forward and backward direction about an axis passing horizontally through the seat, is provided by the pitch drive assembly 128 best illustrated in FIGS. 6 and 7. The pitch drive assembly 128 includes a pin 130, a pitch link 132, and a hydraulic actuation cylinder 134. The pin 130 extends in a horizontal direction from the back portion of the upper part 104 of the housing of the spherical bearing 96. One end of the hydraulic actuation cylinder 13 is mounted to the upper surface of the rear of the seat stage assembly 56 and extends in a vertical direction. At its distant end, the actuation cylinder 134 is attached to the pitch link 132 which extends vertically through a slot 136 located in the plate assembly 124. The slot 136 is elongated along the length of the plate assembly 124 to allow the pitch link 132 to remain in a vertical orientation when the plate assembly 124 is moved laterally as the plate assembly moves side to side with the yaw tube, as previously described. At its upper end, the pitch link 132 includes a slot 138 which is also elongated in a horizontal direction. The pin 130 connected at one end to the rear of the upper part 104 of the housing of the spherical bearing 96 extends horizontally through the slot 138 at the upper end of the pitch link 132. The slot 138 is elongated to accommodate for rotational movement of the pin 130 during yaw.

In operation, pitch is attained by actuation of the hydraulic cylinder 134. As the pitch link 132 moves vertically, so does the pin 130, biasing the upper part 104 of the housing to rotate forward about the sphere 98.

Figure 8:
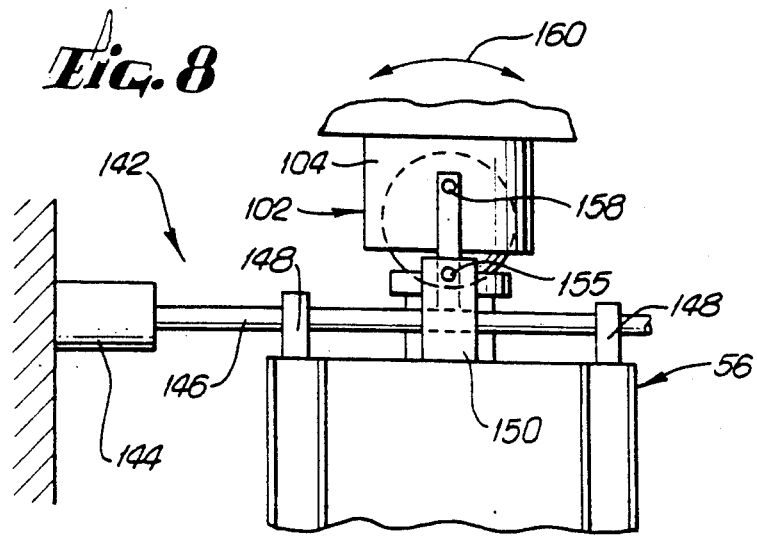
FIG. 8 shows a front view of the roll drive assembly of the present invention.

Roll, or sideways pivoting of the seat about an axis passing through the front and back of the seat, is attained by actuation of the roll drive assembly 142, best illustrated in FIGS. 7 and 8. The roll drive assembly 142 includes a hydraulic actuation cylinder 144, a roll tube 146, two slider bearings 148, a foundation guide 150, and a pivot member 154. The roll tube 146 extends in a horizontal direction at the front of the seat stage assembly 56. The roll tube 146 passes through the two linear slider bearings 148 which are attached to the upper surface of the seat stage assembly 56. The foundation guide 150 is fixedly attached to the upper surface of the seat stage assembly between the slider bearings 148. The pivot member 154 is pivoted about its center at a pin 155 mounted to the foundation guide 150. A first end 156 of the pivot member 154 is attached to the roll tube 146 and second end 158 to the front of the upper part 104 of the spherical bearing housing 102. As the roll tube 146 is moved axially via activation of the hydraulic cylinder 144, the pivot member 154 pivots about the pin 155. The second end 158 of the pivot member 154 rotates about the pin 155, biasing the spherical bearing housing 102 and the seat 58 to rotate about the sphere 98 in the direction of the arrow 160, producing roll.

Forward and backward movement of the seat is attained by actuation of a hydraulic cylinder 162 (see FIG. 1) located between the front wall of the trench or hole 62 and one of the front vertical frame members 82 of the intermediate stage assembly, or alternately located between the back wall of the trench or hole 62 and one of the back vertical frame members 82 of the intermediate stage assembly. When the hydraulic cylinder 162 is activated or deactivated, the intermediate stage assembly 54 moves forward or backward as the guide wheels 83 move along the channels 86.

Side to side movement of the seat apparatus 50 is attained placing a hydraulic cylinder 164 to the side of the foundation stage assembly 52 (see FIG. 2). Activation and deactivation of the hydraulic cylinder 164 results in lateral movement of the foundation stage assembly 52 as the guide wheels 68 roll within the channels 72.

Upward and downward motion of the seat may be obtained by placing a hydraulic cylinder 166 between the intermediate stage assembly 54 and the seat stage assembly 56 (FIGS. 1 and 2). As the hydraulic cylinder 166 is activated or deactivated, the seat stage assembly 56 moves upward or downward as the guide wheels 90 of the seat stage assembly roll along the channels 94 of the intermediate stage assembly 54.

The present invention has been described only with reference to a single seat and supporting apparatus. As can be appreciated, the present invention can also be utilized with respect to simultaneous movement of a plurality of seats, such as is desired in seats for dark shows typical of that shown at amusement parks where an entire audience seated in simulator seats is shown a common video or other program. Of course, the invention may be applied to any number of seat assemblies, whether located in the same row, aisle, or set of rows or aisles. For example, a common hydraulic cylinder such as cylinder 144 may be used to initiate roll in a plurality of seat assemblies if a common roll tube is used. A common hydraulic cylinder such as cylinder 127 may be used to initiate yaw in a plurality of seat assemblies if a common yaw tube is utilized. Bracing adjacent foundation stage assemblies together with rigid brackets or other similar structure may enable a common hydraulic cylinder such as cylinder 164 to be used to actuate side to side motion of a plurality of seat assemblies in the same row. Similarly, bracing adjacent intermediate stage assemblies together may enable a common hydraulic cylinder such as cylinder 162 to be used to actuate forward and backward motion to a plurality of adjacent seat assemblies in the same row. Moreover, firmly bracing adjacent seat stage assemblies together may enable a common hydraulic cylinder such as cylinder 166 to be used to actuate upward and downward motion to a plurality of adjacent seat assemblies.

The present invention is particularly advantageous in multiple seat assembly configuration. Because common hydraulics may be utilized, all of the disadvantages associated with past designs utilizing separate sets of hydraulics for each seat may be minimized. In addition, because movement of each seat about the spherical bearing is prevented during power failure, the possibility of personal injury associated with lurching or "pinching" is entirely eliminated.

As can be appreciated, as the number of seats in a row or portion of a row is increased, the load applied to each hydraulic cylinder will naturally increase. It may therefore be necessary to provide multiple hydraulic cylinders for certain movements, particularly up and down motion of the seat stage assemblies provide more than one hydraulic cylinder for each desired degree of motion, with each cylinder spaced an appropriate distance from the others.

I claim:

1. An apparatus for simulating motion, comprising:
   a support structure;
   a bearing including at least a portion of a sphere mounted upon the support structure and a housing at least partially enclosing the at least portion of a sphere;
   a seat mounted upon the housing of the bearing;
   biasing means for biasing the housing in contact with the at least portion of a sphere to frictionally prevent relative motion between the housing and the at least portion of a sphere;
   reverse biasing means for selectively biasing the housing out of contact with the at least portion of a sphere to allow for relative motion between the housing and the at least portion of a sphere; and
   automatically actuated motion imparting means for automatically imparting motion to the housing relative to the at least portion of a sphere during activation of the reverse biasing means.

2. An apparatus according to claim 1, wherein the housing includes two opposing parts, each part enclosing a portion of the at least portion of a sphere, and the biasing means comprises at least one spring extending between the two opposing parts of the housing.

3. An apparatus for simulating motion, comprising:
   a support structure;
   a bearing including at least a portion of a sphere mounted upon the support structure and a housing at least partially enclosing the at least portion of a sphere;
   a seat mounted upon the housing of the bearing;
   biasing means for biasing the housing in contact with the at least portion of a sphere to frictionally prevent relative motion between the housing and the at least portion of a sphere;
   reverse biasing means for selectively biasing the housing out of contact with the at least portion of a sphere to allow for relative motion between the housing and the at least portion of a sphere;
   motion imparting means for imparting motion to the housing relative to the at least portion of a sphere during activation of the reverse biasing means;
   wherein the housing includes two opposing parts, each part enclosing a portion of the at least portion of a sphere, and the biasing means comprises at least one spring extending between the two opposing parts of the housing; and
   wherein the reverse biasing means comprises a source of high pressure air which may be activated to pass high pressure air between the sphere and the housing.

4. An apparatus for simulating motion, comprising:
   a support structure;
   a bearing including at least a portion of a sphere mounted upon the support structure and a housing at least partially enclosing the at least portion of a sphere;
   a seat mounted upon the housing of the bearing;
   biasing means for selectively biasing the housing in and out of contact with the at least portion of a sphere to respectively prevent and enable relative motion between the housing and the at least portion of a sphere; and
   automatically actuated motion imparting means for automatically imparting motion to the housing relative to the at least portion of a sphere during activation of the biasing means.

5. An apparatus according to claim 4, wherein the housing includes two opposing parts, each part enclosing at least a portion of the at least portion of a sphere, and the biasing means comprises at least one solenoid extending between the two opposing parts of the housing.

6. An apparatus for simulating motion, comprising:
   a first integral support structure having wheels which enable movement in a first direction;
   a first motion imparting means for imparting motion to the first integral support structure in the first direction;
   a second integral support structure mounted upon the first integral support structure, the second integral support structure having wheels which enable movement in a second direction orthogonal to the first direction;
   a second motion imparting means for imparting motion to the second integral support structure in the second direction;
   a third integral support structure mounted upon the second integral support structure, the third integral support structure having wheels which enable movement in a third direction orthogonal to both the first and second directions;
   a third motion imparting means for imparting motion to the third integral support structure in the third direction;
   a bearing mounted upon the third integral support structure, the bearing including at least a portion of a sphere and a housing having an corresponding concave interior such that the housing may rotate with in the directions of pitch, roll and yaw about the at least a portion of a sphere;
   a seat mounted upon the housing of the bearing;
   biasing means for selectively biasing the housing in and out of contact with the at least portion of a sphere to respectively prevent and enable relative motion between the housing and the at least portion of a sphere;
   yaw imparting means for imparting yaw motion to the housing with respect to the at least a portion of a sphere;
   pitch imparting means for imparting pitch motion to the housing with respect to the at least a portion of sphere; and
   roll imparting means for imparting roll motion to the housing with respect to the at least a portion of sphere.

7. An apparatus according to claim 6, wherein the yaw, pitch and roll imparting means may be actuated only when the biasing means biases the housing out of contact with the at least a portion of sphere.

8. An apparatus according to claim 6, wherein the yaw imparting means includes an actuation tube passing adjacent the housing and an interconnection between the actuation tube and the housing such that axial movement to the actuation tube results in yaw motion of the housing.

9. An apparatus according to claim 6, wherein the pitch imparting means includes a hydraulic cylinder mounted between the second integral support structure and the housing such that actuation of the hydraulic cylinder results in pitch motion of the housing.

10. An apparatus according to claim 6, wherein the housing of the bearing includes two opposing parts, with each part enclosing at least a portion of the at least a portion of a sphere, and the biasing means comprises a solenoid extending between the two parts of the housing.

11. An apparatus according to claim 6, wherein the housing of the bearing includes two opposing parts, with each part enclosing at least a portion of the at least a portion of a sphere, and the biasing includes at least one spring extending between the two parts of the housing and a source of high pressure air which may be passed between the at least a portion of a sphere and at least one part of the housing.

12. An apparatus according to claim 6, wherein the roll imparting means includes a roll tube passing adjacent the housing and a pivot member having a center and a first and second ends such that its center is pivoted about a predetermined pivot point, its first end is connected to the roll tube and its second end connected to the housing such that axial movement of the roll tube results in roll motion of the housing.

13. An apparatus for simulating motion, comprising:
at least two seat assemblies, wherein each of the seat assemblies includes
a first integral support structure having wheels which enable movement in a first direction;
a first motion imparting means for imparting motion to the first integral support structure in the first direction;
a second integral support structure mounted upon the first integral support structure, the second integral support structure having wheels which enable movement in a second direction orthogonal to the first direction;
a second motion imparting means for imparting motion to the second integral support structure in the second direction;
a third integral support structure mounted upon the second integral support structure, the third integral support structure having wheels which enable movement in a third direction orthogonal to both the first and second directions;
a third motion imparting means for imparting motion to the third integral support structure in the third direction;
a bearing mounted upon the third integral support structure, the bearing including at least a portion of a sphere and a housing having an corresponding concave interior such that the housing may rotate with in the directions of pitch, roll and yaw about the sphere; a seat mounted upon the housing of the bearing;
biasing means for selectively biasing the housing in and out of contact with the at least portion of a sphere to respectively prevent and enable relative motion between the housing and the at least portion of a sphere; and
common motion imparting means for imparting motion to each housing with respect to its respective sphere.

14. An apparatus according to claim 13, wherein the common motion imparting means includes means for imparting yaw motion to each housing with respect to its respective sphere.

15. An apparatus according to claim 13, wherein the common motion imparting means includes means for imparting pitch motion to each housing with respect to its respective sphere.

16. An apparatus according to claim 13, wherein the common motion imparting means includes means for imparting roll motion to each housing with respect to its respective sphere.

17. An apparatus according to claim 13, wherein the common motion imparting means includes means for imparting yaw, pitch and roll motion to each housing with respect to each sphere.

* * * * *